(12) United States Patent
Boariu et al.

(10) Patent No.: US 9,516,671 B2
(45) Date of Patent: Dec. 6, 2016

(54) SHARED HARQ FEEDBACK CHANNELS FOR VIRTUAL GROUPING IN A WIRELESS RELAY NETWORK

(75) Inventors: Adrian Boariu, Irving, TX (US); Shashikant Maheshwari, Irving, TX (US); Haihong Zheng, Coppell, TX (US)

(73) Assignee: Nokia Solutions and Networks OY, Espoo (FI)

( * ) Notice: Subject to any disclaimer, the term of this patent is extended or adjusted under 35 U.S.C. 154(b) by 2559 days.

(21) Appl. No.: 12/147,373

(22) Filed: Jun. 26, 2008

(65) Prior Publication Data

US 2009/0010198 A1 Jan. 8, 2009

Related U.S. Application Data

(60) Provisional application No. 60/948,112, filed on Jul. 5, 2007, provisional application No. 60/969,438, filed on Aug. 31, 2007.

(51) Int. Cl.
*H04B 7/14* (2006.01)
*H04W 72/12* (2009.01)
*H04L 1/18* (2006.01)
(Continued)

(52) U.S. Cl.
CPC ........ *H04W 72/1289* (2013.01); *H04L 1/1854* (2013.01); *H04L 1/1861* (2013.01); *H04B 7/2606* (2013.01); *H04L 2001/0097* (2013.01); *H04W 84/047* (2013.01)

(58) Field of Classification Search
CPC .................... H04B 7/2606; H04B 2001/0097; H04W 84/047

USPC ......................................... 370/329, 330, 315
See application file for complete search history.

(56) References Cited

U.S. PATENT DOCUMENTS

| 5,537,414 A | 7/1996 | Takiyasu et al. |
| 8,149,757 B2 * | 4/2012 | Zheng ................ H04B 7/15557 370/279 |

(Continued)

FOREIGN PATENT DOCUMENTS

| CN | 1663197 A | 8/2005 |
| CN | 1836401 A | 9/2006 |

(Continued)

OTHER PUBLICATIONS

LAN/MAN Standards Committee of the IEEE Computer Society and the IEEE Microwave Theory and Techniques Society, IEEE Standard for Local and metropolitan area networks Part 16, Amendment 2 and Corrigendum 1., Feb. 28, 2006, The Institute of Electrical and Electronics Engineers, Inc., PDF: ISBN 0-7381-4857-1 SE95394, pp. 323-325.*

(Continued)

*Primary Examiner* — Faisal Choudhury
(74) *Attorney, Agent, or Firm* — Brake Hughes Bellerman LLP

(57) ABSTRACT

Various embodiments are disclosed, which may include transmitting a transmission schedule for a data burst to a plurality of relay stations in a wireless relay network. The transmission schedule may identify a data channel for transmission of the data burst and a corresponding shared negative acknowledgment feedback channel for transmission of a negative acknowledgment. The negative acknowledgment feedback channel may be shared by the plurality of relay stations.

9 Claims, 12 Drawing Sheets

(51) Int. Cl.
*H04B 7/26* (2006.01)
*H04L 1/00* (2006.01)
*H04W 84/04* (2009.01)

(56) References Cited

U.S. PATENT DOCUMENTS

| | | | |
|---|---|---|---|
| 2006/0007887 A1* | 1/2006 | Kwon et al. | 370/329 |
| 2006/0195767 A1* | 8/2006 | Ihm et al. | 714/776 |
| 2006/0270341 A1* | 11/2006 | Kim et al. | 455/16 |
| 2007/0002766 A1 | 1/2007 | Park et al. | |
| 2007/0190933 A1* | 8/2007 | Zheng | H04B 7/15557 455/7 |
| 2007/0254715 A1* | 11/2007 | Li et al. | 455/561 |
| 2007/0286226 A1* | 12/2007 | Yoon et al. | 370/445 |
| 2008/0068979 A1* | 3/2008 | Visotsky et al. | 370/208 |
| 2008/0084844 A1* | 4/2008 | Reznik et al. | 370/330 |
| 2008/0085677 A1* | 4/2008 | Sheen | H04W 40/32 455/7 |
| 2008/0108355 A1* | 5/2008 | Oleszcsuk | H04W 72/1263 455/442 |
| 2008/0137605 A1* | 6/2008 | Berg | 370/330 |
| 2008/0212615 A1* | 9/2008 | Ranta-Aho et al. | 370/498 |
| 2009/0006778 A1* | 1/2009 | Sidi et al. | 711/154 |
| 2009/0141676 A1* | 6/2009 | Maheshwari et al. | 370/329 |

FOREIGN PATENT DOCUMENTS

| | | |
|---|---|---|
| WO | 2003105353 A2 | 12/2003 |
| WO | 2009004448 A2 | 1/2009 |
| WO | 2009004448 A3 | 1/2009 |

OTHER PUBLICATIONS

Wiemann, H. et al., "A novel multi-hop ARQ concept", Vehicular technology conference, vol. 5, (2005), pp. 3097-3101.

Yu, G. et al., "Cooperative ARQ in wireless networks: Protocols description and performance analysis", IEEE, International conference, (2006), pp. 3608-3614.

"International Search Report & Written Opinion for PCT Application No. PCT/IB2008/001693, mailed Dec. 23, 2008, 11 Pages."

"Baseline Document for Draft Standard for Local and Metropolitan Area Networks" IEEE 802.16j-06/026r2,. Jun. 2007.

Bahceci, Israfil et al. "DL and UL HARQ Method for RS Group" IEEE C802.16j-07/313r1.

International Preliminary Report on Patentability received for International Patent Application No. PCT/IB2008/001693, mailed on Jan. 14, 2010, 8 pages.

"Part 11: Wireless LAN Medium Access Control (MAC) and Physical Layer (PHY) Specifications", IEEE Standard for Information technology—Telecommunications and information exchange between systems—Local and metropolitan area networks—Specific requirements, IEEE Std. 802.11-2007, Revision of IEEE Std 802.11-1999, Jun. 12, 2007, 1231 pages.

* cited by examiner

SHARED HARQ FEEDBACK CHANNELS FOR VIRTUAL GROUPING IN A WIRELESS RELAY NETWORK

PRIORITY CLAIM

This application claims the benefit of priority based on U.S. Provisional Application No. 60/948,112, filed Jul. 5, 2007, entitled, "Shared HARQ Feedback Channels for Virtual Grouping in a Wireless Relay Network," as well as U.S. Provisional Application No. 60/969,438, filed Aug. 31, 2007, also entitled, "Shared HARQ Feedback Channels for Virtual Grouping in a Wireless Relay Network," the disclosures of both of which are hereby incorporated by reference.

TECHNICAL FIELD

This description relates to wireless relay networks.

BACKGROUND

In wireless networks, relay stations may extend the coverage range of the network. Relay stations may, for example, receive and forward data between a base station and a mobile station (or mobile station or subscriber station). Relay stations may be used in, for example, IEEE 802.16 WiMax networks, 802.11 WLAN networks, or cellular telephone networks.

In a relay network, multiple relay stations may provide feedback such as acknowledgements (ACKs) or negative ACKs (NAKs) to provide for reliable communications. However, in some cases, this may create an inefficient use of channel resources.

SUMMARY

According to one example embodiment, a method may include transmitting a transmission schedule by a parent station for a data burst to a plurality of relay stations in a wireless network. The transmission schedule may identify a data channel for transmission of the data burst and a corresponding shared negative acknowledgment (NAK) feedback channel for transmission of a NAK. The NAK feedback channel may be shared by the plurality of relay stations.

According to another example embodiment, a method may include determining, at a relay station of a wireless network or virtual group, that a data burst was not received via a scheduled data channel. The method may further include sending a negative acknowledgment (NAK) via a shared NAK feedback channel to a parent station. The shared NAK feedback channel for the data burst may be shared by the relay station with at least one other relay station.

According to another example embodiment, a method may include using, by a relay station in a wireless network or virtual group, a shared uplink (UL) negative acknowledgment (NAK) feedback channel corresponding to a data burst to send a local NAK corresponding to the data burst to a parent station. The UL NAK feedback channel may be shared with at least one other relay station in the wireless network or virtual group. The method may also include using a shared UL ACK channel to forward, to the parent station, an end-to-end ACK or NAK (the end-to-end ACK or NAK report may provide the decoding status of data burst(s) at a mobile station) from a mobile station corresponding to the data burst. The shared UL ACK channel may be shared among the plurality of relay stations for the data burst.

According to another example embodiment, a method may include receiving, by a parent station, from a plurality of relay stations in a wireless network or virtual group, a data burst via a shared channel and an acknowledgment (ACK) via a shared ACK channel. The shared ACK channel may correspond to the data burst. The method may further include sending, to the plurality of relay stations, an ACK/NAK report indicating if the data burst was received successfully or not.

According to another example embodiment, a method may include receiving a data burst from a mobile station in a wireless network or virtual group. The method may further include forwarding, via a shared data forwarding channel, the data burst to a parent station in the wireless network or virtual group. The method may further include sending an ACK to the parent station. The ACK may be sent via a shared acknowledgment (ACK) channel corresponding to the shared data forwarding channel. The method may further include receiving by the virtual group, via an ACK/NAK receiving channel, an ACK/NAK report map from the parent station indicating receipt of the data burst. The method may further include forwarding the ACK/NAK map to the mobile station.

According to another example embodiment, an apparatus, such as a relay station, may include a controller. The apparatus may be configured to determine that a data burst was not received via a scheduled data channel. The apparatus may be further configured to send a negative acknowledgment (NAK) via a shared NAK feedback channel to a parent station. The shared NAK feedback channel for the data burst may be shared by the apparatus with at least one relay station in a wireless network.

In a further example embodiment, the apparatus may be further configured to use a shared uplink (UL) acknowledgment (ACK) channel to forward, to the parent station, an end-to-end ACK from the mobile station corresponding to the data burst. The shared UL ACK channel may be shared among the plurality of relay stations for the data burst.

According to another example embodiment, an apparatus, such as a parent station, may include a controller. The apparatus may be configured to transmit a transmission schedule for a data burst to a plurality of relay stations in a wireless network, the transmission schedule identifying a data channel for transmission of the data burst and a corresponding shared negative acknowledgment (NAK) feedback channel for transmission of a NAK, the NAK feedback channel being shared by the plurality of relay stations. The apparatus may also be configured to transmit the data burst to the plurality of relay stations via the data channel, and receive a NAK via the shared NAK feedback channel from at least two of the plurality of relay stations.

According to another example embodiment, an apparatus, such as a parent station, may include a controller. The apparatus may be configured to receive, from a plurality of relay stations in a wireless network, a data burst via a shared data channel and an acknowledgment (ACK) via a shared ACK channel, the shared ACK channel corresponding to the data burst. The apparatus may also be configured to send, to the plurality of relay stations, an acknowledgment map indicating successful receipt of the data burst.

According to yet another example embodiment, an apparatus, such as a relay station, may include a controller. The apparatus may be configured to receive a data burst from a mobile station in a wireless network to forward, via a shared data forwarding channel, the data burst to a parent station in the wireless network to send, via a shared acknowledgment (ACK) channel corresponding to the shared data forwarding channel, an ACK to the parent station to receive, via a shared ACK/NAK receiving channel, an ACK/NAK map report from the parent station indicating receipt of the data burst, and to forward the ACK/NAK map to the mobile station.

The details of one or more implementations are set forth in the accompanying drawings and the description below. Other features will be apparent from the description and drawings, and from the claims.

DETAILED DESCRIPTION

Figure 1:
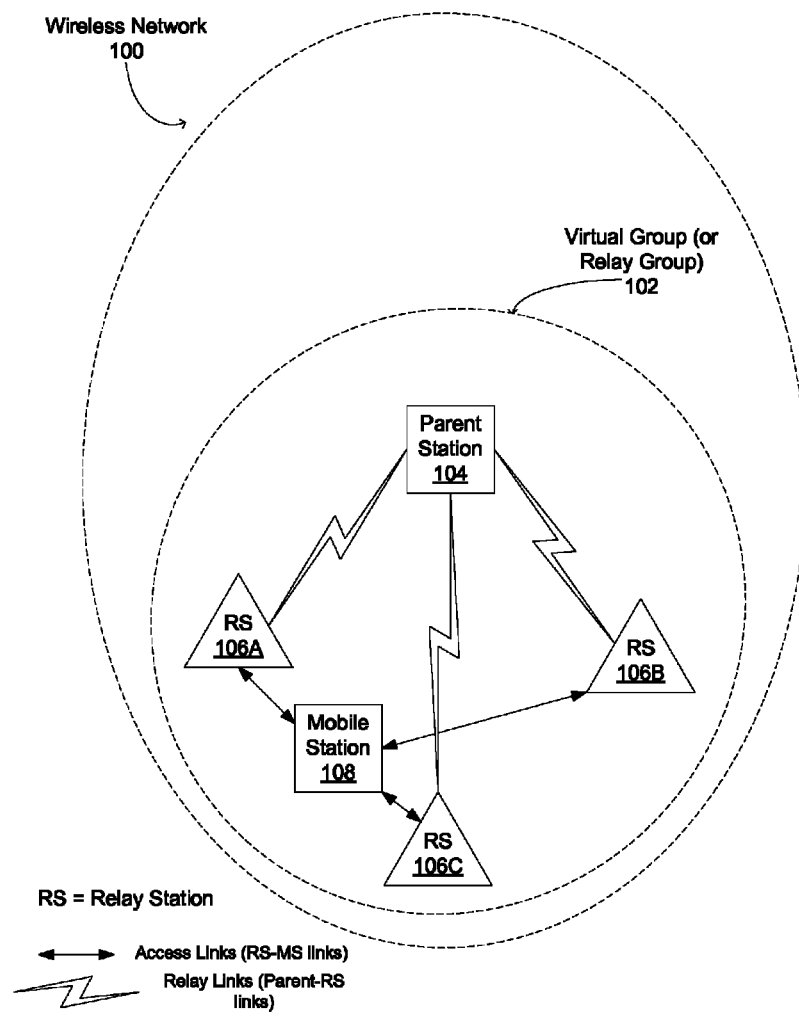
FIG. 1 is a block diagram of a wireless network according to an example embodiment.

According to an example embodiment, shared data channels and/or shared feedback channels may be shared by a plurality of relay stations in a relay network. This may allow multiple relay stations to share a feedback channel to provide an ACK or NAK to a parent station for a data burst. For example, for Downlink (DL) data transmission (data transmission in the direction from parent station to mobile station, via one or more relay stations), a shared NAK (negative acknowledgement) channel transmitted on the Uplink (UL) may be shared by a plurality of relay stations, e.g., to allow one or more of the relay stations in a virtual group or relay group to send a local NAK (e.g., indicating a failure to receive a data burst) to a parent station.

In an example embodiment, if a relay station in a virtual group/relay group receives the data burst successfully or correctly, then the relay station may not send anything to the parent station using (or via) the shared NAK channel. For example, NAKs may be received at the parent station from multiple relay stations via the same NAK channel, and may be combined at the parent station via diversity combining and/or superposition. Thus, by providing a single shared NAK channel for a data burst shared by a plurality of relay stations in a wireless relay network, a more efficient use of channel resources may be achieved, e.g., rather than providing for multiple NAK feedback channels (such as a separate NAK channel for each relay station). In an example embodiment, a NAK from any, or all, of the relay stations may allow the parent station to retransmit the corresponding data burst, or the parent station may await a failure to receive an end-to-end ACK for the burst before retransmitting the data burst.

For example, a relay station may only send a NAK if the data burst is not successfully received, and may, for example, not send a local ACK to the parent station if the data burst was received successfully. Thus, if the parent station does not receive a NAK via the scheduled NAK channel for a data burst, the parent station may assume that the data burst was successfully received by one or more of the relay stations. This may avoid, for example, each relay station sending a separate ACK upon successful receipt of the data burst from the parent station. In this example, when the parent station does not receive an end-to-end ACK from the mobile station via the relay stations, the parent station may configure or request the relay stations to perform a retransmission of the data burst.

Similarly, a shared ACK (acknowledgement) channel may be shared by a plurality of relay stations, e.g., to allow one or more of these relay stations to forward to the parent station an end-to-end ACK received from a mobile station. The end-to-end ACK may be sent from the mobile station to one or more of the relay stations if the data burst is successfully received by the mobile station. Each relay station may then forward the end-to-end ACK (received from the mobile station) to the parent station via the shared ACK channel. If the parent station receives an ACK via the shared ACK channel, this may inform the parent station that the data burst was successfully received by the mobile station or end-point. Thus, rather than providing a separate ACK channel for each relay station, a single or common ACK channel may be shared among a group of relay stations (e.g., among a virtual group or relay group), to allow a more efficient use of channel resources.

In an example embodiment, if the mobile station does not receive the data burst correctly or successfully, then the mobile station may typically send a NAK, and the relay stations in the virtual group may receive this NAK from the mobile stations. When the relay stations receive the NAK (or do not receive anything) from the mobile station, then the relays stations may typically not send anything to the parent RS on the shared ACK channel. When the parent station does not receive an end-to-end ACK or receives nothing on the shared ACK channel, the parent station may assume that the mobile station has not received the data burst correctly or successfully. In this case, the parent station may either retransmit the data burst itself, or may request retransmission from the group of relay stations which received the data burst correctly/successfully.

In another example embodiment, for data transmission in the uplink (UL) direction (e.g., towards the parent station), the mobile station may send one or more UL data bursts, which may be received by the group of relay stations. If a relay station (or each relay station) receives the data burst from the mobile station successfully, the relay station may transmit or forward the data burst via a shared data channel, and forward an ACK for the data burst to the parent station via a shared ACK channel. If any of the relay stations in the group do not receive the data burst successfully from the mobile station, then those relay stations may, for example, not forward the erroneous or unreceived data on the shared channel, and also, for example, may not send anything (such as an ACK) on the shared ACK channel. The data channel and ACK channel may be shared among a plurality of relay stations, which may be part of a virtual group or relay group.

The channels allocated for NAK feedback channel or ACK channel, or other channels, may include any channel allocations, such as a combination of carrier (or sub-carrier) frequency and/or time slot, for example.

Therefore, according to an example embodiment, shared data channels and/or shared ACK or NAK channels may be provided on the relay link between the parent station and the (subordinate) relay station within a virtual group. The use of these shared channels may allow a more efficient use of channel resources.

These are merely some examples, and further details of the various embodiments will now be described.

A wireless relay network may include a parent station, such as a base station or parent relay station, one or more (subordinate) relay stations, and one or more mobile stations or subscriber stations. The relay stations may, for example, extend the range or coverage area and/or capacity of the parent station by receiving and forwarding data between the parent station and the one or more mobile stations. The relay network may include one "hop," in which the one or more relay stations receive and forward the data directly to and from the parent station and mobile station, or multiple hops, in which the relay stations may receive the data from and/or forward the data to other relay stations in the wireless relay network. In an example of a relay network with multiple hops, a relay station which transmits, receives, and/or forwards data to and from another relay station which is farther from the base station may be considered a "parent station" relative to the other relay station; the base station may also be considered a parent station relative to a relay station which receives data from and forwards data to the base station. Where multiple relay stations forward the same data between a mobile station and a base station, the multiple relay stations may, from the perspective of the mobile station and/or base station, function like a single relay station, and may be considered a "virtual group" or a relay group.

The parent station (e.g., base station or parent relay station) may control and/or transmit a transmission schedule to other stations, such as subordinate relay stations, within a virtual group. The transmission schedule may also be referred to as a medium access protocol (MAP) message or allocation table. The transmission schedule may identify scheduled channels (or channel allocations) for uplink and/or downlink transmissions. Uplink (UL) may be in a direction from the mobile station to the base station via one or more relay stations. Downlink (DL) may be in a direction from the base station to the mobile station, via one or more relay stations. The transmission schedule may be provided in a variety of formats, and may include, for example, a preamble, a DL MAP, an UL MAP, DL data, and UL data.

Figure 10:
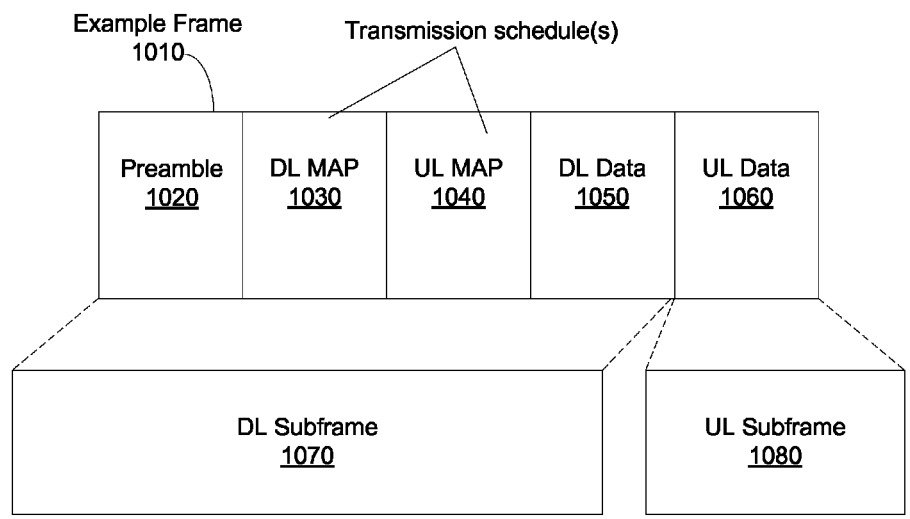
FIG. 10 is a diagram illustrating a frame, including a transmission schedule(s) or MAPs, according to an example embodiment.

FIG. 10 is a diagram illustrating a frame 1010 according to an example embodiment. Frame 1010 may include a preamble 1020, a DL MAP 1030 (e.g., providing a transmission schedule for downlink data for this frame), and an UL MAP 1040 (e.g., providing a transmission schedule for uplink transmission, typically to occur in a subsequent frame).

After the UL MAP 1040 and DL MAP 1030, UL data 1060 may be provided, which may allow relay stations to transmit data to the parent station (in an uplink direction). Fields 1020, 1030, 1040 and 1050 may be considered a DL subframe 1070, while the UL data 1060 may be considered an UL subframe 1080.

The transmission schedule may include a DL MAP 1030 and/or an UL MAP 1040. A transmission schedule for a data burst and its corresponding shared feedback channels may be provided across one or more frames. For example, the transmission schedule may include a downlink MAP or schedule identifying a shared data channel for transmission of a data burst to a plurality of relay stations within a virtual group, and an uplink MAP or schedule identifying a corresponding shared NAK feedback channel for use by the plurality of relay stations within the virtual group to transmit (e.g., in a subsequent frame) a NAK for the data burst. Thus, in this example, both the schedule for the data burst and the schedule for the shared NAK channel may be provided with a same frame.

In another example embodiment, the transmission schedule for the data burst and the corresponding feedback channel(s) may be communicated in two different frames. For example, the transmission schedule may include a downlink MAP or schedule within a first frame identifying a shared data channel for transmission of a data burst to a plurality of relay stations within a virtual group, and an uplink MAP or schedule within a second frame identifying a corresponding shared NAK feedback channel for use by the plurality of relay stations within the virtual group to transmit a NAK for the data burst.

In an example embodiment, the DL MAP 1030 or UL MAP 1040 may identify a mobile station CID (connection identifier), or may identify a multicast ID for the virtual group, such as a multicast relay station ID for the virtual group. The MAP 1030, 1040 may, for example, provide a MSCID or multicast RSID and identify the channel resources (e.g., time slot, frequency or carrier) for the data burst channel and/or the feedback channel.

Each MAP may include control data, such as a modulation and/or coding scheme used for transmission of data, and a transmission schedule identifying channels for transmission. The transmission schedule may, for example, identify one or more data channels for transmission of one or more data bursts such as data bursts, with each data burst being allocated its own data channel, as well as a shared feedback channel(s). The feedback channels may be used in a hybrid automatic repeat request (HARQ) scheme in which acknowledgments (ACKs) and/or negative acknowledgments (NAKs) may be sent or not sent based on whether a recipient station correctly received a data burst. For example, a NAK feedback channel may correspond to a data channel, and a NAK may be sent (or nothing may be sent) through its NAK feedback channel based on whether the corresponding data burst was not correctly or successfully received by the parent station, relay station, or mobile station. In another example, an ACK feedback channel may correspond to a data channel, and an ACK may be sent (or nothing may be sent) through its ACK feedback channel based on whether the corresponding data burst was correctly received by the parent station, relay station, or mobile station.

The DL MAP 1030 may indicate scheduled channels for DL transmissions, while the UL MAP 1040 may indicate scheduled channels for UL transmissions. The DL MAP 1030 may indicate scheduled channels for DL transmission of one or more data bursts, as well as control signals such as ACKs and NAKs. The UL MAP 1040 may identify scheduled channels for UL transmissions such as data and control signals. The ACKs and NAKs scheduled in each MAP message may be transmitted in an opposite direction from the data scheduled in the respective MAP message, i.e., the ACKs and NAKs scheduled in the DL MAP may be transmitted for the data burst in the UL direction, whereas the ACKs and NAKs scheduled in the UL MAP may be transmitted for data burst in the DL direction.

The scheduled channels may include allocation of any type of channel resources, such as a combination of a carrier (or sub-carrier) frequency, a time slot, and/or codes. For example, different combinations of carrier frequencies and time slots may be allocated for a DL data burst, or for allocations of ACKs or NAKs in an UL direction. A data burst may include, for example, one or more packets which may be transmitted together. Thus, each data burst may be, for example, a single packet data burst, or a multi-packet data burst (e.g., including 5 or 10 packets or some other number of packets). Each data packet in the data burst may or may not be allocated an equal share of the resources, such as bandwidth or time. According to an example embodiment, the ACKs or NAKs may each correspond to an entire data burst, regardless of the number of packets included in the data burst (e.g., the ACK or NAK provides an acknowledgement or negative acknowledgement for the entire burst, for example), according to an example embodiment.

In one example embodiment, a parent station may allocate a channel (e.g., frequency and/or time slot) for a DL transmission of a data burst. The parent station may also allocate or schedule a different channel for a corresponding UL ACK or UL NAK from each relay station which may receive the data burst. The relay stations may forward the received data burst on to the mobile station, and may also each send a corresponding ACK or NAK to the parent station on their scheduled ACK/NAK channel. Providing a separate reserved time slot or channel for each relay station to send to the base station or parent station its ACK or NAK which corresponds to the data burst may be, at least in some cases, a relatively inefficient use of channel resources. For example, a base station or parent station (base station or parent relay station) may transmit a data burst, and then each receiving relay station may transmit an ACK on its own scheduled ACK channel back to the base station or parent station. In this case, a single ACK could have been sufficient to provide confirmation to the base station of successful receipt of the data burst by some of the relay stations in a virtual group or relay group.

Therefore, according to another example embodiment, the relay stations may use a shared channel for transmission of data and/or the ACKs and/or NAKs. FIG. 1 is a block diagram of a wireless network 100 according to an example embodiment. According to this example, the wireless network 100 may include a network in which a plurality of stations communicate via an air interface, such as an IEEE 802.16 WiMax network, an 802.11 WLAN network, or a cellular telephone network, as non-limiting examples. The wireless network 100 may include a virtual group 102. The virtual group 102 may include a parent station 104, a plurality of relay stations 106A, 106B, 106C, and at least one mobile station 108. While three relay stations 106A, 106B, 106C are shown in FIG. 1, any number, such as one, two, or more relay stations 106A, 106B, 106C may be included in the virtual group 102.

The parent station 104 may include an 802.11 access point, a cellular base station, or a relay station located in the uplink direction relative to the other stations 106A, 106B, 106C. The parent station 104 may send or transmit a transmission schedule for one or more data bursts to the relay stations 106A, 106B, 106C. The transmission schedule may identify a data channel for transmission of each of one or more data bursts. The data channel may include a time slot, frequency band, and/or code for transmission of the data burst. The transmission schedule may also identify one or more feedback channels for each data burst. The feedback channels may each include a time slot, frequency band, and/or code for transmission of a feedback signal, such as an ACK or a NAK. The feedback signals may be local feedback signals, indicating whether a data burst was successfully received by a station to which the data burst was directly sent, and/or end-to-end feedback signals, indicating whether a data burst sent by the parent station 104 to mobile station 108 via the relay stations 106A, 106B, 106C was successfully received by the mobile station 108; if the mobile station 108 does not receive the data burst successfully, then the end-to-end feedback signal may indicate which relay station 106A, 106B, 106C on the path received the data burst correctly. For example, a shared local NAK feedback channel may be used by the relay stations 106A, 106B, 106C to indicate that a data burst from the parent station 104 was not successfully received by at least one of the relay stations 106A, 106B, 106C via a data channel identified in the transmission schedule. According to another example, a shared end-to-end ACK feedback channel may be used by the relay stations 106A, 106B, 106C to indicate that a data burst was successfully received by the mobile station 108 or end-to-end feedback signal may indicate which station 106A, 106B, 106C on the path receives the data burst correctly.

The mobile station 108 may include a cellular phone, smartphone, personal digital assistant (PDA), notebook computer, or other wireless device or subscriber station, according to example embodiments. The mobile station 108 may be associated with a connection identifier (CID), which identifies the connection between the mobile station 108 and the parent station 104. The relay stations 106A, 106B, 106C may or may not transmit the UL and/or DL transmission schedule to the mobile station 108. The relay stations 106A, 106B, 106C may or may not know the identity of the mobile station 108 (such as the mobile station's 108 CID) in the virtual group 102 or wireless network 100. The parent station 104 may reduce processing overhead by not transmitting the identity of the mobile station 108 to the relay stations 106A, 106B, 106C, according to an example embodiment. In this example, the relay stations 106A, 106B, 106C may forward data bursts, ACKs, and/or NAKs by retransmitting the data bursts, ACKs, and/or NAKs.

The relay stations 106A, 106B, 106C may be configured to receive and forward messages or packets or bursts between the parent station 104 and the mobile station 108. The relay stations 106A, 106B, 106C may be mobile or fixed. As members of the virtual group 102, the relay stations 106A, 106B, 106C may appear to the parent station 104 and/or the mobile station 108 to function as a single relay station. When forwarding messages, the relay stations 106A, 106B, 106C may send each data burst via a single shared data channel. For example, the relay stations 106A, 106B, 106C may each send the data burst at the same time and/or during the same time slot. Due to the different locations and velocities of the relay stations 106A, 106B, 106C, as well as other multipath factors, the time between transmission and receipt of the data burst, as well as the frequency, may vary for each relay station 106A, 106B, 106C; accordingly, the parent station 104 and/or the mobile station 108 may receive the data burst at approximately the same time and/or via approximately the same frequency band. Similarly, the relay stations 106A, 106B, 106C may each send ACKs and/or NAKs via a single shared feedback channel, and the parent station 104 and/or the mobile station 108 may receive the ACK and/or NAK at approximately the same time and/or via approximately the same frequency band. The channels via which the data, ACKs, and/or NAKs are sent may have been identified by the transmission schedule.

Figure 2A:
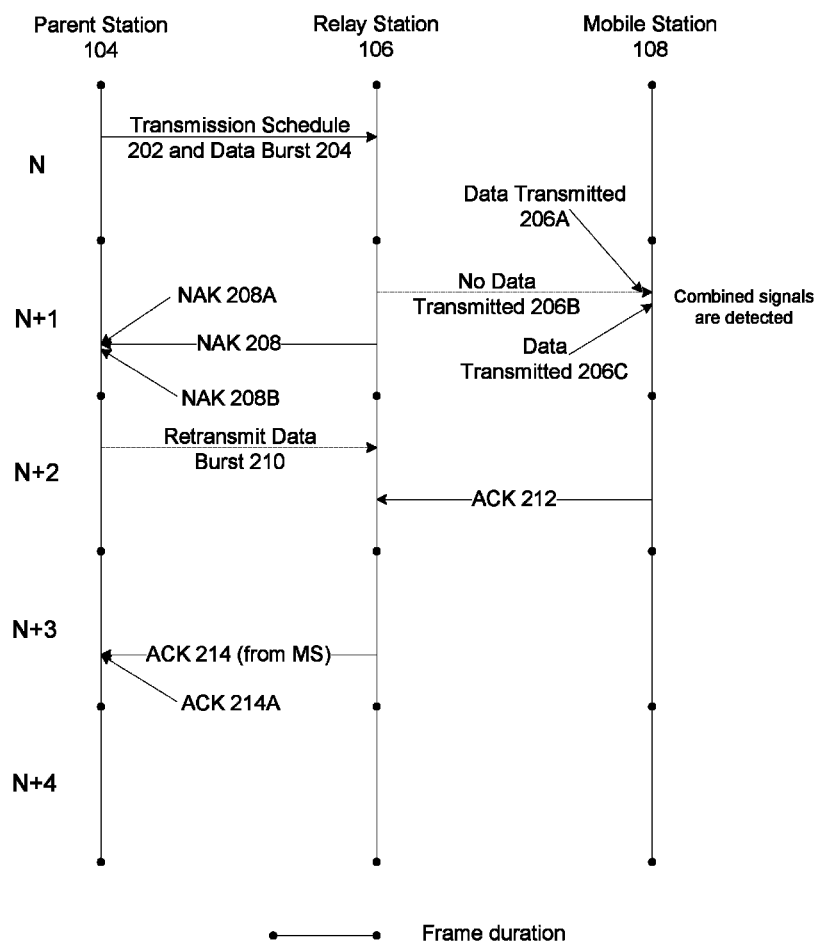
FIG. 2A is a vertical-time sequence diagram showing a flow of signals for downlink data transmission according to an example embodiment.

FIG. 2A is a vertical-time sequence diagram showing a flow of signals for downlink data transmission according to an example embodiment. In this example, signals may be transmitted between the parent station 104 and the relay stations 106, and between the relay stations 106 and the mobile station 108; the relay stations 106 may forward data from the parent station 104 to the mobile station 108. While FIG. 2A shows signals being transmitted during time frames N through N+3, this is merely an example, and signals may be transmitted during any number of time frames.

According to an example embodiment, the parent station 104 may transmit a transmission schedule 202 to the relay stations 106 within frame N. The transmission schedule 202, which may be a DL transmission schedule, may identify a data channel for transmission of each of one or more data bursts from the parent station 104 to the relay station 106. The transmission schedule 202 may also identify a NAK feedback channel corresponding to each of the one or more data bursts. Each NAK feedback channel may be shared by the plurality of relay stations 106 included in the virtual group 102. The transmission schedule 202 may be included in a data burst in a "piggyback" mode, or may be transmitted separately from any data burst.

The parent station 104 may transmit a data burst 204 to the relay stations 106 via the scheduled data channel for the data burst, for example, within frame N. The relay stations 106 may or may not receive the data burst 204, and each relay station 106A, 106B, 106C may either determine that the data burst was received via the scheduled data channel, or may determine that the data burst was not received via the scheduled data channel. Each of the relay stations 106 which determines that it received the data burst 204 may forward the data burst to the mobile station 108; any relay station 106 which determines that it did not receive the data burst 204 may not forward any data to the mobile station 108.

In the example shown in FIG. 2A, the relay station 106A successfully receives the data burst 204 and transmits data to the mobile station 108 (206A), the relay station 106B does not successfully receive the data burst 204 and does not transmit data to the mobile station 108 (206B), and the relay station 106C does successfully receive the data burst 204 and does transmit data to the mobile station 108. The relay stations 106A, 106C which successfully received the data burst 204 may forward the data burst 204 to the mobile station 108 via a shared channel, according to an example embodiment. The transmission of data by the relay stations 106A, 106C to the mobile station 108 via shared data channel is shown by the solid lines denoted 206A, 206C which point toward the mobile station 108, whereas the non-transmission of data by the relay station 106B to the mobile station 108 is shown by the dashed line denoted 206B which points toward the mobile station 108. The transmission of data from the relay stations 106A, 106C may occur during time frame N+1, according to an example embodiment.

During, for example, frame N+1, the relay station 106B may, based on determining that it did not successfully receive the data burst 204 from the parent station 104, send a NAK 208 to the parent station 104. The relay station 106B may, for example, determine that it did not successfully receive the data burst 204 based on a failure of the relay station 106B to decode the data burst 206B. The NAK 208 may be a local NAK, indicating that the direct transmission of the data burst 204 from the parent station 104 to the relay station 106 was not successfully received. The NAK 208 may be sent to the parent station 104 via the shared NAK feedback channel identified in the transmission schedule 202. The parent station 104 may, or may not, be able to determine which relay station 106 sent the NAK 208.

According to another example, one, two, or more of the relay stations 106 which did not successfully receive the data burst 204 may send the NAK 208 to the parent station 104 via the shared NAK feedback channel. For example, the relay stations 106 may send the NAK 208 to the parent station 104 at the same time, along the same frequency, and, if applicable (e.g., on the same channel or channel allocation for NAK feedback). In this example, the parent station 104 may receive the NAK 208 from the two or more relay stations 106 at approximately the same time and via approximately the same frequency band. The relay station 106 which did receive the data burst successfully from the parent relay station may, for example, not send anything on the shared NAK feedback channel.

The parent station 104 may receive the NAK 208 from one, two or more, or any number of the relay stations 106. According to an example embodiment, the parent station 104 may not be able to determine, or simply may not incur the processing overhead to determine, how many of the relay stations 106 sent the NAK 208. Thus, the parent station 104 may not know whether only one relay station 106 sent the NAK 208, from which it could be inferred that the remaining relay stations 106 did successfully receive the data burst 204, whether all of the relay stations 106 sent the NAK 208, from which it could be inferred that none of the relay stations 106 successfully received the data burst 204, or whether any other number of relay stations 106 sent the NAK 208. In this example, the parent station 104 knows only that at least one relay station 106 sent the NAK and did not successfully receive the data burst 204, or that none of the relay stations 106 sent a NAK and therefore all of the relay stations 206 successfully received the data burst 204.

The parent station 104 may, in response to receiving the NAK 208, retransmit the data burst 204 to the relay stations 106 as data burst 210. The parent station 104 may retransmit the data burst 204 preemptively before the parent station receives an end-to-end ACK/NAK report from the mobile station 108, according to an example embodiment. Data burst 210 may be identical to data burst 204, or data burst 210 may be a modified version of data burst 204, such as by using a modified encoding scheme to ensure reliable transmission. The data burst 204 may be retransmitted to the relay stations 106 as data burst 210 during frame N+2, according to an example embodiment.

After successfully receiving the data burst 210, the relay stations 106 may forward the data burst 210 to the mobile station 108, or may send a NAK to the parent station 204, requesting retransmission of the data burst 210, according to an example embodiment. According to another example embodiment, the relay stations 106 may not immediately forward the data burst 210, but may wait until after the parent station 104 receives the end-to-end ACK/NAK report from the mobile station 108 (such as the signals 212 and 214, described below).

After successful transmission of the data burst 204 to the relay nodes 106, the parent station 104 may send further data bursts via data channels identified by the transmission schedule 202, with corresponding NAK feedback channels allocated as identified by the transmission schedule 202. After all of the data bursts corresponding to the identified data channels have been sent, the parent station 104 may send a new transmission schedule to the relay stations 106, identifying data channels for more data bursts and corresponding NAK feedback channels.

Figure 2B:
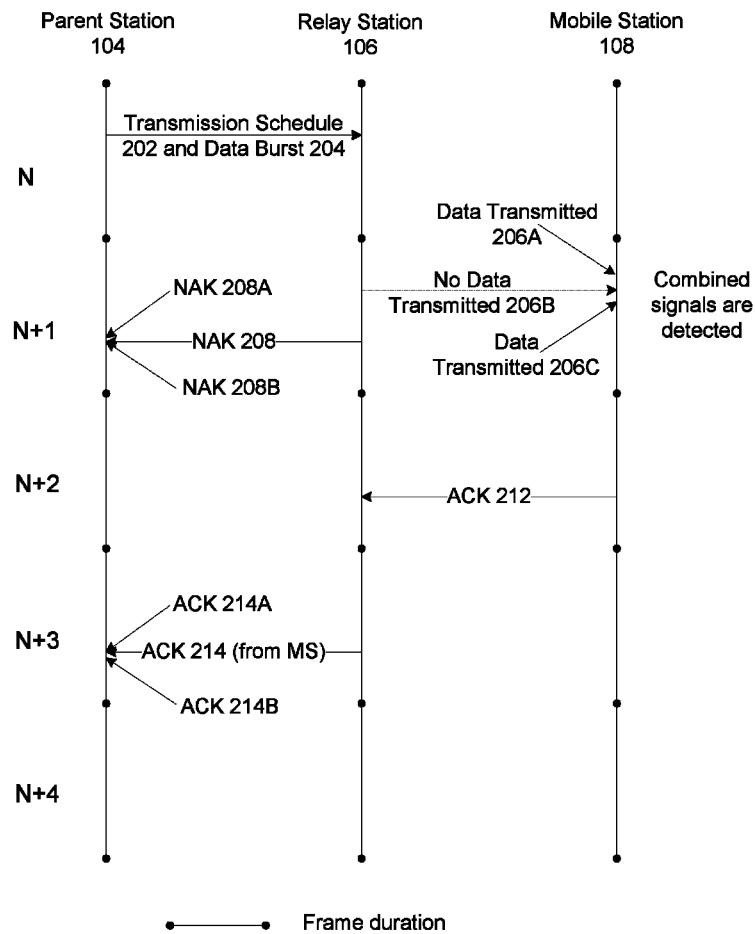
FIG. 2B is a vertical-time sequence diagram showing a flow of signals for downlink data transmission according to another example embodiment.

FIG. 2B is a vertical-time sequence diagram showing a flow of signals for downlink data transmission according to another example embodiment. In this example, however, the parent station 104 may not retransmit the data burst 204 in response to receiving the NAK 208. Instead, in this example, the parent station 104 may wait to receive an end-to-end ACK via an end-to-end ACK feedback identified by the transmission schedule 202 (such as the signals 212 and 214, described below).

In this example shown in FIG. 2B, as in the example shown in FIG. 2A, the mobile station 108 successfully receives the data burst 204 from the relay stations 106A, 106C (206A, 206C). Based on successfully receiving the data burst 204 from at least one of the relay stations 106 (in this example 106A, 106C), the mobile station 108 may send an ACK 212 (which may be a local ACK) to the relay station 106. The mobile station 108 may send the ACK 212 during frame N+2, according to an example embodiment. The mobile station 108 may send the ACK 212 to the relay stations 106 based on receiving the data burst 204 from at least one of the relay stations 106; according to an example embodiment, the mobile station 108 may not determine how many of the relay stations 106 the mobile station 108 received the data burst 106 from, but may determine only whether the mobile station 108 received the data burst 204 from at least one of the relay stations 106.

According to an example in which the transmission schedule 202 identifies channels for transmission between the relay stations 106 and the mobile station 108, the mobile station 108 may send the ACK 212 to the relay stations 106 via a channel identified by the transmission schedule. According to an example in which the transmission schedule 202 does not identify channels for transmission between the relay stations 106 and the mobile station 108, the mobile station 108 may send the ACK 212 to the relay stations 106 according to a protocol defined between the relay stations 106 and the mobile station 108.

Based on receiving the ACK 212 from the mobile station 108, the relay stations 106 may forward, at frame N+3, the end-to-end ACK 214 to the parent station 104 via a shared end-to-end ACK feedback channel, according to an example embodiment. The shared end-to-end ACK channel may have been identified by the transmission schedule 202. The relay stations 106 may send the end-to-end ACK 214 at the same time and/or along the same frequency band, and the parent station 104 may receive the end-to-end ACK at approximately the same time and/or along approximately the same frequency band, according to an example embodiment.

According to an example embodiment, if the mobile station 108 does not receive a data burst successfully, then it may send a NAK. One or more of (or even all of) the relay stations 106 in the relay group/virtual group may receive this NAK from mobile station 108. When the relay stations 106 receive the NAK from mobile station 108, they typically will not send anything on the shared end-to-end ACK channel towards the parent station 104, as this shared end-to-end ACK channel is used only for forwarding ACKs, and not for forwarding NAKs.

The parent station 104 may receive the end-to-end ACK 214 from one, at least two, or any number of the relay stations 106. Based on determining that the parent station 104 received the end-to-end ACK 214 from at least one of the relay stations 106, the parent station 104 may determine that the data burst 204 was received successfully, and determine not to retransmit the data burst 204 to the relay stations 106, and may transmit a new data burst, for example.

If the parent station 104 does not receive an end-to-end ACK 214 from at least one of the relay stations 106 at frame N+3, via the end-to-end ACK feedback channel identified by the transmission schedule 202, the parent station 104 may retransmit the data burst 204 in a subsequent frame. The parent station 104 may not receive an end-to-end ACK via the end-to-end ACK feedback channel because the relay stations 106 did not send an end-to-end ACK based on not receiving the ACK 212 from the mobile station 108, for example. The parent station 104 may choose, for example, to schedule the retransmission of the data only from the relay stations 106 to the mobile station 108 (instead of from the parent station 104 to the relay stations 106 to the mobile node 108), if any of the relay stations 106 have received the data correctly. Also, for example, if not all relay stations 106 received correctly the data, the parent station 104 may schedule a data retransmission both for relay link and access link.

According to an example embodiment, the relay stations 106 may report the ACKs and/or NAKs to the parent station 104 using codewords. The codewords may, for example, indicate whether the data burst 204 was not successfully received by the relay station 106 from the parent station 104 (NAK 208) (e.g., codeword $C_0$), whether the data burst 204 was successfully received by the relay station 106 from the parent station 104 (ACK) and was successfully received by the mobile station 108 from the relay station 106 (ACK 212) (e.g., codeword $C_1$), or whether the data burst 204 was successfully received by the relay station 106 from the parent station 104 (ACK) but not successfully received by the mobile station 108 from the relay station 106 (NAK) (e.g., codeword $C_2$).

The codeword $C_2$ may provide the parent station 106 with more information in an example in which the mobile station 108 did not receive the data burst 204 correctly. If the mobile station 108 did not receive the data burst 204 correctly, then the ACK 212 shown in FIGS. 2A and 2B may be a NAK report. In this example, those relay stations 106 which have received the data burst 204 correctly from the parent station 104 and have received the NAK signal report from the mobile station 108 may transmit to the parent station 104 the codeword index $C_2$ (ACK 214 in FIGS. 2A and 2B). When parent station 104 receives the codeword $C_2$, the parent station 104 may determine that one or all of the relay stations 106 received the data burst 204 correctly, and that the some or all of the relay stations 106 also received the NAK from the mobile station 108; this may mean that the mobile station 108 is in the coverage area of relay stations 106 that received the data burst 204 correctly. This information may allow the parent station 104 to schedule retransmission of the data burst 204 that failed from the relay stations 106 to the mobile station 108, rather than also retransmitting the data burst 204 from the parent station 104 to the relay stations 106.

The codewords may be represented by tile combination vectors, such as those shown in the following table:

| Codeword index | Vector Indices per tile Tile(0), Tile (1), Tile(2) | Description |
|---|---|---|
| $C_0$ | 0 0 0 | Data burst from parent station was not received correctly by the relay (NAK). |
| $C_1$ | 1 1 1 | Data burst from parent station was received |

| Codeword index | Vector Indices per tile Tile(0), Tile (1), Tile(2) | Description |
| --- | --- | --- |
| | | correctly by the relay (ACK) and the mobile station received the data burst correctly (ACK). |
| $C_2$ | 2 2 2 | Relay received data burst correctly from the parent station (ACK), but the mobile station reported that it did not receive the data burst correctly (NAK). |

The tile combination vector (i.e., Tile(0), Tile(1), or Title(2)) sent via the channel may be orthogonally modulated with quadrature phase-shift keying (QPSK) symbols, for example. The tiles or vector indices, which may make up an 8-ary alphabet, may each be represented by eight QPSK symbols, such as by the orthogonal modulation index shown in the following table, in which the vector index shown in the left-hand column corresponds to one of the three vector indices shown in the center column of the previous table:

| Vector index | QPSK symbols (codewords) |
| --- | --- |
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

For example, the codeword identified as vector index "0" may be represented by the eight QPSK symbols "P0, P1, P2, P3, P0, P1, P2, P3". In an example embodiment, P0 may correspond to a forty-five degree phase shift, P1 may correspond to a one-hundred and thirty-five degree phase shift, P2 may correspond to a negative forty-five degree phase shift, and P3 may correspond to a negative one-hundred and thirty-five degree phase shift.

An alternative orthogonal modulation index is shown in the following table:

| Vector index | QPSK symbols (codewords) |
| --- | --- |
| 0 | P0, P0, P0, P0, P0, P0, P0, P0 |
| 1 | P2, P2, P2, P2, P2, P2, P2, P2 |
| 2 | P1, P1, P1, P1, P1, P1, P1, P1 |
| 3 | P3, P3, P3, P3, P3, P3, P3, P3 |
| 4 | P0, P1, P2, P3, P0, P1, P2, P3 |
| 5 | P2, P3, P0, P1, P2, P3, P0, P1 |
| 6 | P1, P2, P3, P0, P1, P2, P3, P0 |
| 7 | P3, P0, P1, P2, P3, P0, P1, P2 |

The codewords transmitted by each relay station 106 may, for example, be superimposed and transmitted via a shared channel. The parent station 104 may separate the codewords based on the orthogonality of the symbols, according to an example embodiment.

According to another example embodiment, the relay stations 106 may send, via the shared channel, ACKs and/or NAKs which indicate which relay station 106 sent the ACK or NAK. For example, the NAK 208 may include a codeword which indicates which relay station 106 sent the NAK 208. The codewords may, for example, be represented by vector tile combinations, such as those shown in the following table:

| Codeword index | Vector Indices per tile Tile(0), Tile (1), Tile(2) | Description |
| --- | --- | --- |
| $C_1$ | 1 1 1 | NAK for $1^{st}$ relay station in the group |
| $C_2$ | 2 2 2 | NAK for $2^{nd}$ relay station in the group |
| $C_3$ | 3 3 3 | NAK for $3^{rd}$ relay station in the group |
| $C_4$ | 4 4 4 | NAK for $4^{th}$ relay station in the group |
| $C_5$ | 5 5 5 | NAK for $5^{th}$ relay station in the group |
| $C_6$ | 6 6 6 | NAK for $6^{th}$ relay station in the group |
| $C_7$ | 7 7 7 | NAK for $7^{th}$ relay station in the group |

The vector indices may be represented by QPSK symbols, such as those described above. The codewords may be selected to have good separability probabilities, such as being orthogonal signals.

For example, for a group of seven relay stations 106, if the fifth and seventh relay stations 106 did not receive the data burst 204 successfully, they may send the codewords $C_5$, $C_7$, respectively, which may represent NAKs 208 originating from the fifth and seventh relay stations 106. The parent station 104 may determine, based on receiving the codewords $C_5$ and $C_7$, but not receiving the codewords $C_1$, $C_2$, $C_3$, $C_4$, and $C_6$, that the fifth and seventh relay stations 106 did not receive the data burst 204 successfully, but that the first, second, third, fourth, and sixth relay stations 106 did receive the data burst 204 successfully. In this example, if the mobile station 108 sends the ACK 212 to the relay stations 106, the relay stations 106 which detect the ACK 212 forward the ACK to the parent station 104. The ACK 214 may be a codeword which is the same for all of the relay stations 106 (and may be designated $C_0$ and represented by vector indices 0 0 0, according to an example embodiment). The parent station 104 may determine, based on the received codewords, which relay stations 106 successfully received the data burst 204, and may determine whether to retransmit the data burst 204 to the relay stations 106, or to instruct one or more of the relay stations 106 to retransmit the data burst 106 without the parent station 104 retransmitting the data burst 204.

According to another example embodiment, the relay stations 106 may send ACKs but not NAKs in place of the NAK 208. In this example, the relay stations 106 which successfully received the data burst 204 from the parent station 104 may send ACKs using the codewords shown in the above table, with the codewords indicating which relay station 106 is sending the ACK. The relay stations 106 which did not successfully receive the data burst 204 from the parent station 104 may send nothing. In this example, if the mobile station 108 sends the ACK 212 to the relay stations 106, then all of the relay stations 106 may send the ACK 214 to the parent station 104. If the mobile station 108 does not send the ACK 212 to the relay stations 106, or sends a NAK to the relay stations 106, then the relay stations 106 report nothing to parent station 104. The parent station 104 may determine, based on the received codewords, which relay stations 106 successfully received the data burst 204, and may determine whether to retransmit the data burst 204 to the relay stations 106, or to instruct one or more of the relay stations 106 to retransmit the data burst 106 without the parent station 104 retransmitting the data burst.

Figure 2C:
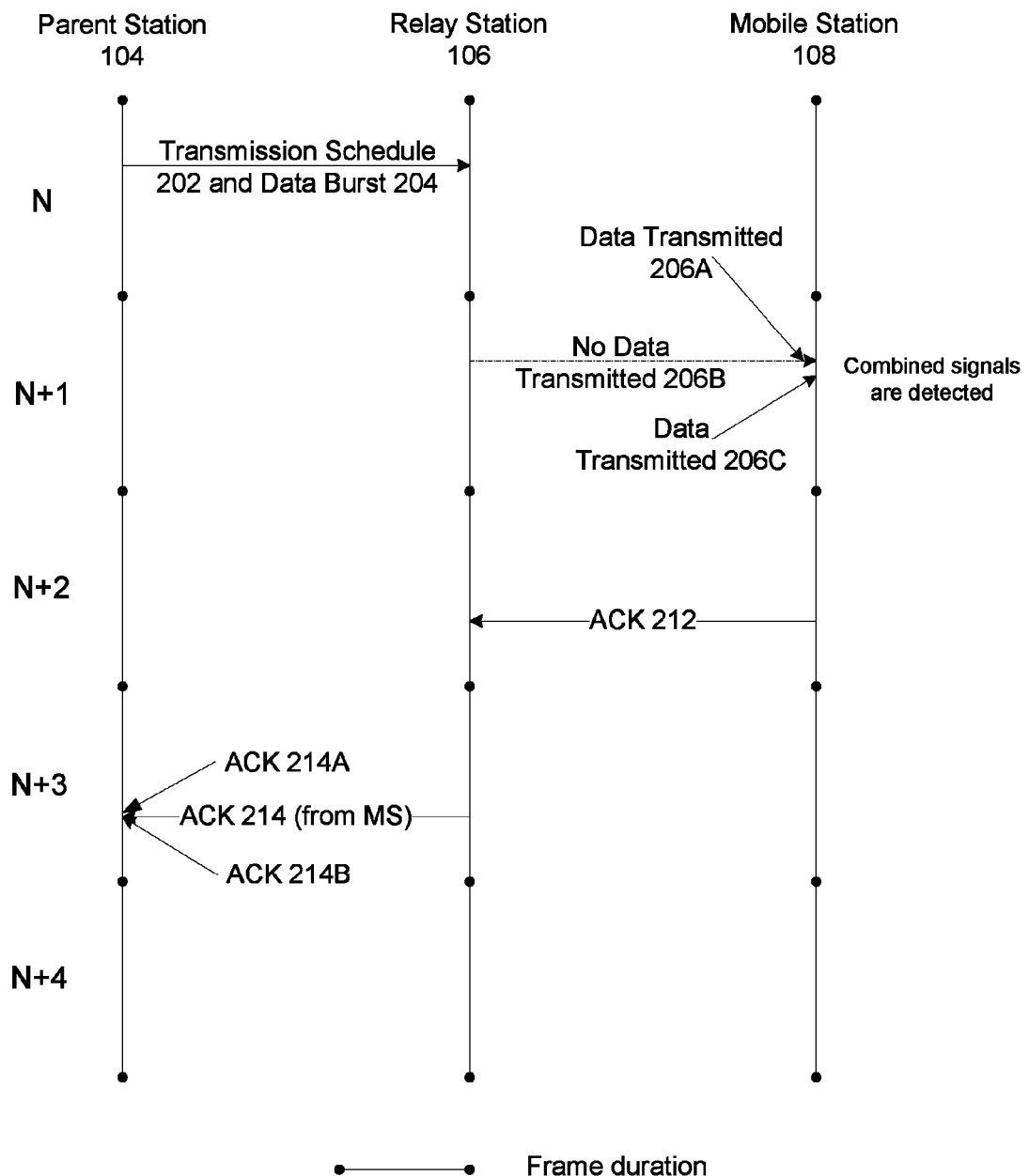
FIG. 2C is a vertical-time sequence diagram showing a flow of signals for downlink data transmission according to another example embodiment.

FIG. 2C is a vertical-time sequence diagram showing a flow of signals for downlink data transmission according to another example embodiment. According to this example, the relay stations 106 may not send the NAK 208, 208A, 208B shown in FIGS. 2A and 2B. In this example, the relay stations 106 may send the parent station 104 a codeword (such as the ACK 214) indicating whether the data burst 204 was not received successfully by the relay station 106 (such as by sending codeword $C_0$), whether the data burst 204 was correctly received by the relay station 106 and by the mobile station 108 (such as by sending codeword $C_1$), or whether the data burst 204 was successfully received by the relay station 106 but not by the mobile station 108 (such as by sending codeword $C_2$). These codewords may be sent according to the table shown in the paragraph above that begins. "The codewords may be represented by tile combination vectors, such as those shown in the following table, "for example.

According to another example related to FIG. 2C, a relay station 106 that is member of the relay group may transmit ACK (codeword $C_0$ represented by vector indices 0 0 0, according to an example embodiment) as a report 214 to the parent station 104 if it receives an ACK (see signal 212) from the mobile station 108. Otherwise, if a relay station 106 receives NAK or nothing from the mobile station 108 as report 212, then the relay station 106 may transmit to the parent station 104 (see signal 214) its assigned codeword according to the table shown below in this paragraph if the data burst 204 was received correctly by the relay, and transmit nothing to the parent station 106 if the data burst 204 was not received correctly. Using this approach, the parent station 106 may detect inconsistencies in the reports from the relay stations 106. For example, for the parent station 104 that receives on the shared channel 214 the codewords $C_0$ (ACK), $C_2$ and $C_4$, this is an inconsistency. The $C_0$ informs that the mobile station 108 received correctly the data, while $C_2$ and $C_4$ informs that second and fourth relay stations received the data burst 204 correctly but the mobile station 108 did not received it correctly. In this situation the parent station 104 may use for example a majority detection procedure and decide that the ACK received was incorrect. This majority detection can be corroborated with other mobile tracking techniques like GPS (global positioning system) that provide the parent station 104 with information about in which relay stations 106 coverage areas the mobile station 108 is located.

| Codeword index used for NAK received from mobile station and data burst received correctly from the parent station | Vector Indices per tile Tile(0), Tile (1), Tile(2) | Description |
| --- | --- | --- |
| $C_1$ | 1 1 1 | $1^{st}$ relay station in the group |
| $C_2$ | 2 2 2 | $2^{nd}$ relay station in the group |
| $C_3$ | 3 3 3 | $3^{rd}$ relay station in the group |
| $C_4$ | 4 4 4 | $4^{th}$ relay station in the group |
| $C_5$ | 5 5 5 | $5^{th}$ relay station in the group |
| $C_6$ | 6 6 6 | $6^{th}$ relay station in the group |
| $C_7$ | 7 7 7 | $7^{th}$ relay station in the group |

Figure 3:
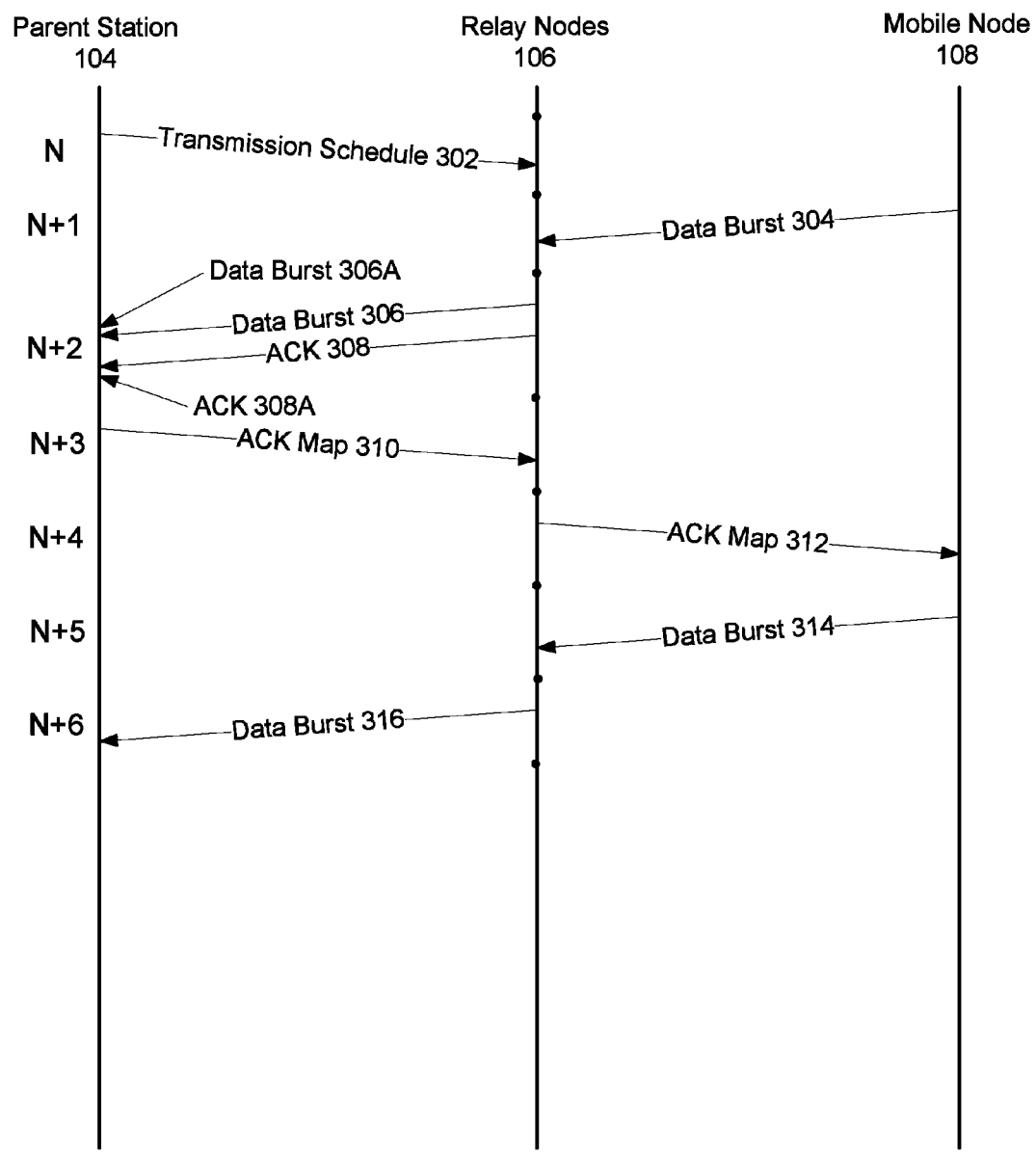
FIG. 3 is a vertical-time sequence diagram showing a flow of signals for uplink data transmission according to an example embodiment.

FIG. 3 is a vertical-time sequence diagram showing a flow of signals for uplink data transmission according to an example embodiment. In this example, signals may be transmitted between the parent station 104 and the relay stations 106, and between the relay stations 106 and the mobile station 108; the relay stations 106 may forward data to the parent station 104 from the mobile station 108.

According to an example embodiment, the parent station 104 may transmit a transmission schedule 202 to the relay stations 106 during frame N. The transmission schedule 302, which may include an UL transmission schedule, may identify a data channel for transmission of each of one or more data bursts from the relay stations 106 to the parent station 104. The transmission schedule 202 may also identify a shared ACK channel corresponding to each of the one or more data bursts. Each ACK feedback channel may be shared by the plurality of relay stations 106 included in the virtual group 102. The transmission schedule 202 may also identify an ACK map channel for transmitting an ACK map from the parent station 104 to the relay stations 106.

During, for example, frame N+1, the mobile station 108 may send a data burst 304 to the relay stations 106. The relay stations 106 may forward the data burst 304 to the parent station 104 as data burst 306. Data burst 306 may be identical to data burst 304, or may be transmitted along a different frequency band, according to a different modulation scheme, using a different encoding scheme, and/or using a different code. The relay stations 106 may transmit the data burst 306 to the parent station 104 via a shared data channel, such as the shared data channel identified by the transmission schedule 302. The shared data channel may, for example, include a common time for transmission by all the relay stations 106 in the virtual group 102 (such as frame N+2), a common frequency band, and/or a common code for transmission. For example, the relay stations 106 may synchronize the forwarding of the data burst 306 to the parent station 104, and/or may synchronize the sending ACK 308 to the parent station 104.

The relay stations 106 may also transmit an ACK 308 to the parent station 104 along a shared ACK channel, such as the shared ACK channel identified by the transmission schedule 302. The shared ACK channel may, for example, include a common time for transmission by all the relay stations 106 in the virtual group 102 (such as frame N+2), a common frequency band, and/or a common code for transmission. The relay stations 106 may transmit the ACK 308 at the same time as the data burst 306, according to an example embodiment.

According to another example embodiment, the relay stations 106 may send, via the shared ACK channel 308, for example, a codeword which indicates which relay station 106 sent the ACK 308. The codewords may, for example, be represented by vector tile combinations, such as those shown in the following table:

| Codeword index | Vector Indices per tile Tile(0), Tile (1), Tile(2) | Description |
| --- | --- | --- |
| $C_1$ | 1 1 1 | ACK for $1^{st}$ relay station in the group |
| $C_2$ | 2 2 2 | ACK for $2^{nd}$ relay station in the group |
| $C_3$ | 3 3 3 | ACK for $3^{rd}$ relay station in the group |
| $C_4$ | 4 4 4 | ACK for $4^{th}$ relay station in the group |
| $C_5$ | 5 5 5 | ACK for $5^{th}$ relay station in the group |
| $C_6$ | 6 6 6 | ACK for $6^{th}$ relay station in the group |
| $C_7$ | 7 7 7 | ACK for $7^{th}$ relay station in the group |

The parent station 104 may determine whether to process the data burst 306, such as by decoding the data burst 306 based on whether the parent station 104 receives the ACK 308 via the shared ACK channel. The parent station 104 may determine whether to process the data burst 306 based on receiving the ACK 308 from at least one of the relay stations 106; the parent station 104 may not determine how many relay stations 106 sent the ACK 308, but only whether the parent station 104 received the ACK 308 from at least one relay station 106, according to an example embodiment. If the parent station 104 determines that an ACK was not sent via the shared ACK channel, then the parent station 104 may not process the data burst 306. By not processing data received via the shared data channel unless the parent station 104 receives an ACK 308 via the shared ACK channel, the parent station 104 may avoid processing noise in cases where no data burst was sent.

After any number, such as one or a plurality, of shared data channels and shared ACK channels (or time slots), the parent station 104 may send an acknowledgment map 310 to the plurality of relay stations 106. The number of shared data channels and shared ACK channels (or time slots) which precede sending the acknowledgment map 310 to the relay stations 106 may be identified by the transmission schedule 302, according to an example embodiment. While the acknowledgment map 310 is shown in FIG. 3 as being sent during frame N+3, the acknowledgment map 310 may be sent by the parent station 104 at any time, such as after a plurality of shared data channels and shared ACK channels via which data bursts and ACKs could have been sent. The acknowledgment map 310 may be sent at a time indicated by the transmission schedule 302, according to an example embodiment.

The acknowledgment map 310 may indicate successful receipt of one or a plurality of data bursts 306 which were successfully received by the parent station 104, according to an example embodiment. For example, the acknowledgment map 310 may indicate whether a data burst was successfully received during via each shared data channel identified by the transmission schedule 302. Or, the acknowledgment map 310 may indicate lack of successful receipt of one or a plurality of data bursts 306, according to another example embodiment.

Upon receipt of the acknowledgment map 310, the relay stations 106 may forward the acknowledgment map 310 as acknowledgment map 312 to the mobile station 108. The acknowledgment map 312 forwarded to the mobile station 108 during frame N+4 may be the same as the acknowledgment map 310 received by the relay stations 106, or the acknowledgment map 312 may be forwarded in a different format, such as along a different frequency, using a different modulation scheme, or using a different encoding scheme, according to example embodiments.

Based on the received acknowledgment map 312, the mobile station 108 may determine which data bursts were not successfully received by the parent station 104. If the mobile station 108 determines, based on the acknowledgment map 312, that the parent station 104 did not successfully receive one or more data bursts, the mobile station 108 may retransmit the data bursts which were not received by the parent relay station 104 (such as upon request). For example, if the mobile station 108 determines that the data burst 304 was not successfully received by the parent station 104, the mobile station 108 may retransmit the data burst 304 as data burst 314 to the relay stations 106 (such as upon request). Data burst 314 may have a similar format to data burst 304, or may be retransmitted using a different encoding scheme to ensure reliable transmission, according to an example embodiment.

The relay stations 106 may forward the data burst 314 to the parent station 104 as data burst 316, according to an example embodiment. The data burst 316 may be transmitted to the parent station 104 by the relay stations 106 via a shared transmission channel indicated by the transmission schedule 302, according to example embodiments. In one example embodiment, the relay stations 106 may also send an ACK to the parent station 104 to notify the parent station 104 that at least one of the relay stations 106 received the data burst successfully from the mobile station 106 and that the parent station 104 should process the data burst 316. In this case, if the parent station 104 receives a NAK from the mobile station 108, it can reschedule the retransmission of the data burst only from relay stations 106 (rather than from the mobile node 108 and through the relay stations 106). In another example embodiment, if the relay stations 106 do not receive the data burst successfully from the mobile station 108, the relay stations 106 do not send an ACK, and the parent station 104 may typically ignore the information received on the shared data channel and may request retransmission using another transmission schedule 302 and same procedure will continue.

Figure 4:
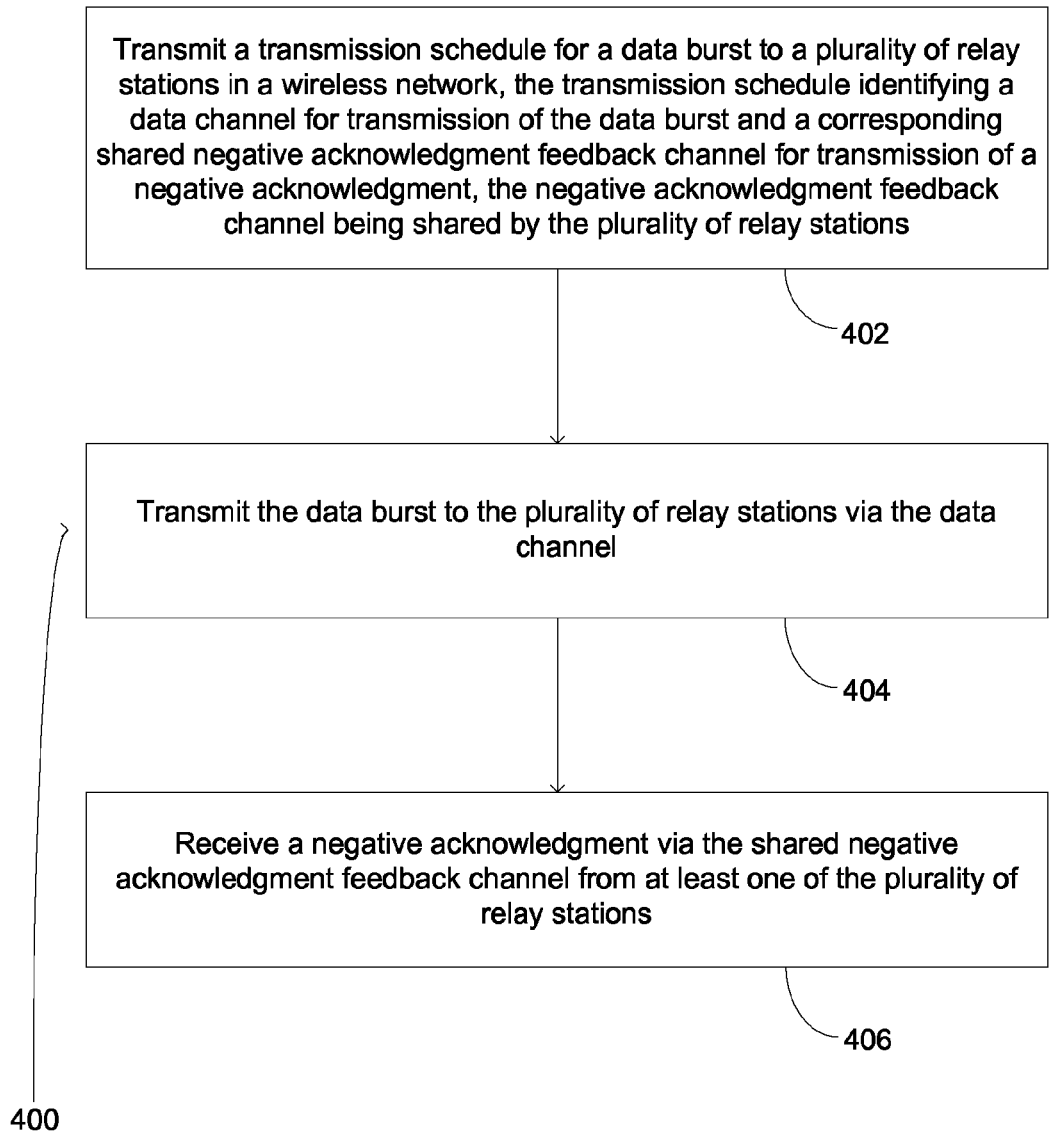
FIG. 4 is a flowchart showing a method according to an example embodiment.

FIG. 4 is a flowchart showing a method 400 according to an example embodiment, which may, for example, be applied for downlink HARQ operation. The method 400 may include transmitting a transmission schedule 202 for a data burst 204 to a plurality of relay stations 106 in a wireless network 100 (402). The transmission schedule 202 may identify a data channel for transmission of the data burst 204 and a corresponding shared negative acknowledgment (NAK) feedback channel for transmission of a NAK. The NAK feedback channel may be shared by the plurality of relay stations.

The method 400 may also include transmitting the data burst 204 to the plurality of relay stations 106 via the data channel (404), and receiving a NAK 208 via the shared NAK feedback channel from at least one of the plurality of relay stations 106 (406).

According to an example embodiment, the method 400 may further include retransmitting the data burst 204 to the plurality of relay stations 106 in response to receiving the NAK 208.

According to another example embodiment, the transmission schedule 202 may further include a corresponding shared end-to-end ACK feedback channel for transmission of an acknowledgment (ACK). The end-to-end ACK feedback channel may be shared by the plurality of relay stations 106. In this example, the method 400 may further include retransmitting the data burst 204 to the plurality of relay stations 106 in response to not receiving an end-to-end ACK from any of the plurality of relay stations 106 via the end-to-end ACK feedback channel.

According to another example embodiment, the receiving (406) may include receiving the NAK 208 from the at least one of the plurality of relay stations 106 at approximately a same time and via approximately a same frequency band.

According to another example, the receiving (406) may include receiving a codeword indicating whether the data burst 204 was not successfully received by the at least one of the plurality of relay stations 106 or by a mobile station 108. According to another example, the receiving (406) may include receiving a codeword indicating which of the plurality of relay stations 106 sent the NAK 208.

According to another example embodiment, the transmission schedule 202 may identify a time slot for transmission of the data burst 204 and a time slot for transmission of the NAK 208. In this example, the time slot for the transmission of the NAK 208 may be shared by the plurality of relay stations 106.

According to another example embodiment, the transmission schedule 202 may identify a data channel for transmission of each of a plurality of data bursts and a plurality of corresponding NAK feedback channels for transmission of a plurality of NAKs corresponding to each of the plurality of data bursts. The plurality of NAK feedback channels may be shared by the plurality of relay stations 106. In this example, each of the plurality of data bursts may be transmitted via its respective data channel identified in the transmission schedule 202.

Figure 5:
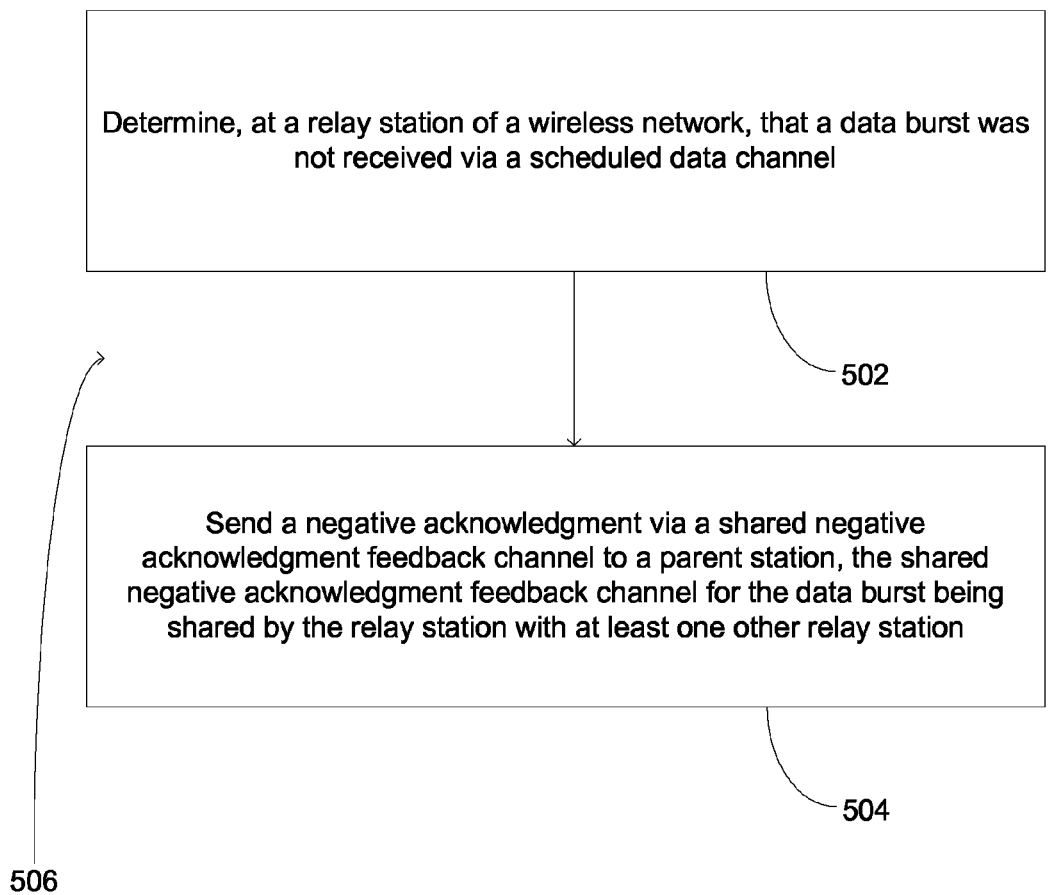
FIG. 5 is a flowchart showing another method according to another example embodiment.

FIG. 5 is a flowchart showing another method 500 according to another example embodiment. In this example, the method 500 may include determining, at a relay station 106 of a wireless network 100 or virtual group 102, that a data burst 204 was not received via a scheduled data channel (502). The method 500 may further include sending a negative acknowledgment (NAK) 208 via a shared NAK feedback channel to a parent station 104 (504). The shared NAK feedback channel for the data burst 204 may be shared by the relay station 106 with at least one other relay station 106.

According to an example embodiment, the method 500 may further include receiving a transmission schedule 202 of the data burst 204. The transmission schedule 202 may identify the scheduled data channel for transmission of the data burst 204 and the corresponding shared NAK feedback channel for transmission of the NAK 208.

According to another example embodiment, the determining (502) may include determining, at the relay station 106 of the wireless network 100 or virtual group 102, that the data burst 204 was not received by the relay station 106 via the scheduled data channel.

According to another example embodiment, the method 500 may further include receiving the data burst 204 again via a scheduled retransmission channel.

According to another example embodiment, the method 500 may further include forwarding an end-to-end ACK 214 from a mobile station 108 to the parent station 104 via a shared end-to-end ACK feedback channel.

According to another example embodiment, the sending (504) may include sending a codeword indicating whether the data burst 204 was not successfully received by the relay station 106 or by a mobile station 108. According to another example embodiment, the sending (504) may include sending a codeword identifying the relay station 106 as sending the NAK 208. According to another example embodiment, the sending (504) may include sending a codeword identifying that the end-to-end 214 report represents ACK for the receiving data burst 204 from the parent station 104 and NAK (212) from the mobile station 108.

Figure 6:
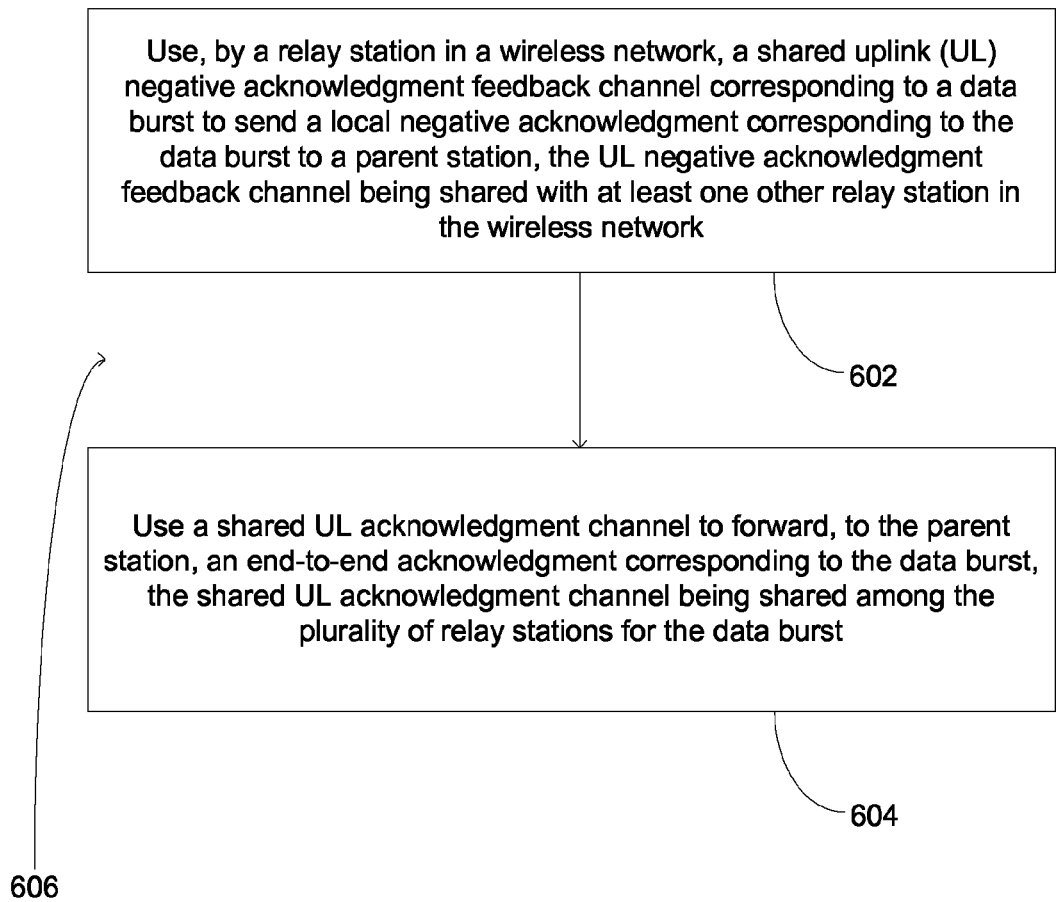
FIG. 6 is a flowchart showing another method according to another example embodiment.

FIG. 6 is a flowchart showing another method 600 according to another example embodiment. According to this example, the method 600 may include using, by a relay station 106 in a wireless network 100 or virtual group 102, a shared uplink (UL) negative acknowledgment (NAK) feedback channel corresponding to a data burst 204 to send a local NAK 208 corresponding to the data burst 204 to a parent station 104 (602). The UL NAK feedback channel may be shared with at least one other relay station 106 in the wireless network 100 or virtual group 102. The method 600 may also include using a shared UL ACK channel to forward, to the parent station 104, an end-to-end ACK 214 corresponding to the data burst 204 (604). The shared UL ACK channel may be shared among the plurality of relay stations 106 for the data burst 204.

According to an example embodiment, using the shared UL NAK feedback channel (602) may include synchronizing the sending the local NAK 208 with the at least one other relay station 106 based on a transmission schedule 202 received from the parent station 104.

According to another example embodiment, the method 600 may further include forwarding a retransmission of the data burst 204 from the parent station 104 to a mobile station 108.

Figure 7:
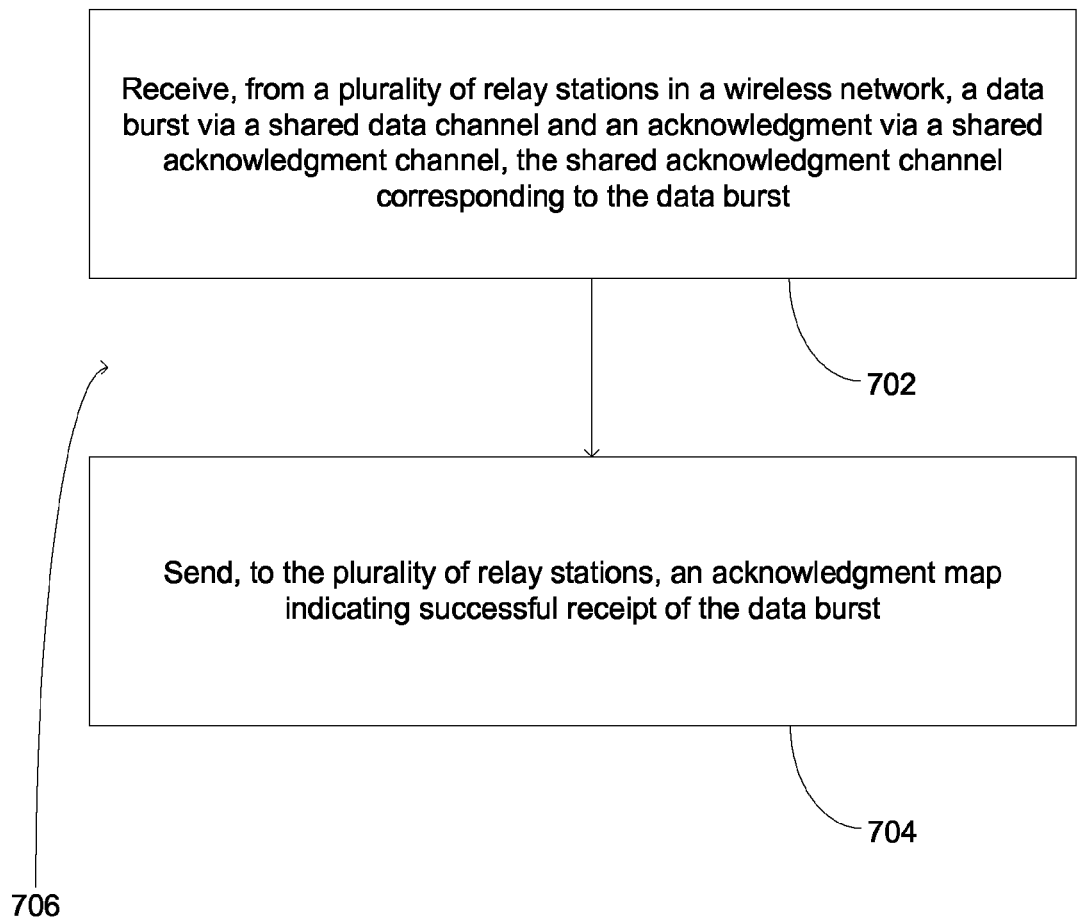
FIG. 7 is a flowchart showing another method according to another example embodiment.

FIG. 7 is a flowchart showing another method 700 according to another example embodiment, which may, for example, be applied for uplink HARQ. According to this example, the method 700 may include receiving, from a plurality of relay stations 106 in a wireless network 100 or virtual group 102, a data burst 306 via a shared channel and an acknowledgment (ACK) 308 via a shared ACK channel (702). The shared ACK channel may correspond to the data burst 306. According to another example, the receiving ACK (308) via a shared ACK channel may include receiving a codeword indicating which of the plurality of relay stations 106 sent the ACK 308. The method 700 may further include sending, to the plurality of relay stations 106, an acknowledgment map 310 indicating successful receipt of the data burst 306 (704).

According to an example embodiment, the receiving (702) may include receiving a plurality of data bursts via a plurality of shared data channels and a plurality of ACKs via a plurality of shared ACK channels. Each of the plurality of ACKs may correspond to one of the plurality of data bursts. In this example, the sending (704) may include sending the acknowledgment map 310 indicating successful receipt of at least one of the plurality of data bursts.

According to another example embodiment, the method 700 may further include decoding the data burst 306 backed on receiving the ACK 308 via the shared ACK channel.

According to another example embodiment, the method 700 may further include decoding the data burst 306 based on receiving the ACK 308.

According to another example embodiment, the method 700 may further include receiving data via an other data channel, and determining not to decode the data based on not receiving an other ACK via an other shared ACK channel, the other ACK channel corresponding to the other data channel.

According to another example embodiment, the method 700 may further include sending a transmission schedule 302 to the plurality of relay stations 106. The transmission schedule 302 may indicate the shared data channel and the shared ACK channel.

Figure 8:
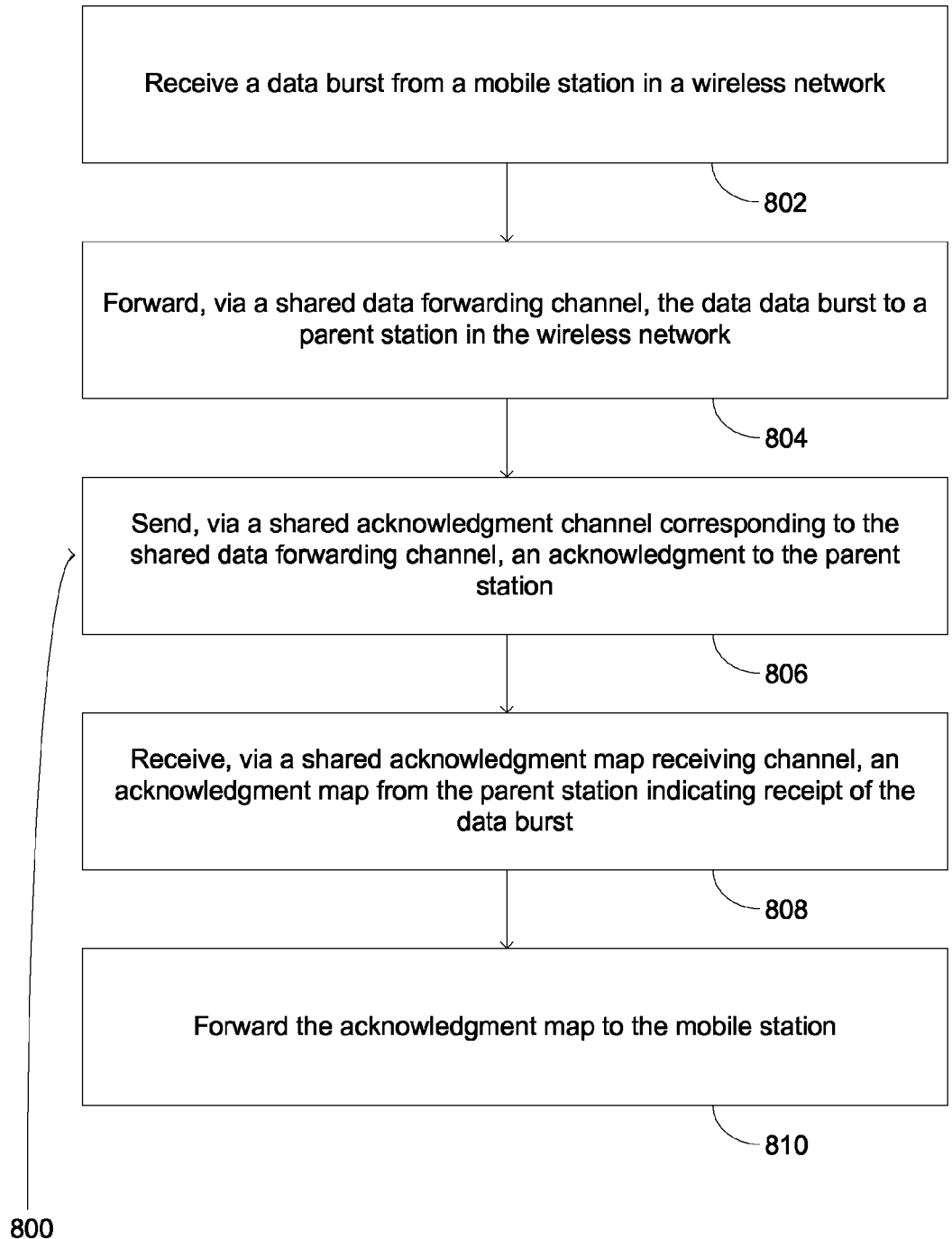
FIG. 8 is a flowchart showing another method according to another example embodiment.

FIG. 8 is a flowchart showing another method 800 according to another example embodiment. The method 800 may include receiving a data burst 304 from a mobile station 108 in a wireless network 100 or virtual group 102 (802). The method 800 may further include forwarding, via a shared data forwarding channel, the data burst 306 to a parent station 104 in the wireless network 100 or virtual group 102 (804). The method 800 may further include sending an ACK 308 to the parent station 104 (806). The ACK 308 may be sent via a shared acknowledgment (ACK) channel corresponding to the shared data forwarding channel. According to another example, the transmitting the ACK (308) via a shared ACK channel may include transmitting a codeword indicating which of the plurality of relay stations 106 sent the ACK 308. The method 800 may further include receiving, via a shared acknowledgment map receiving channel, an acknowledgment map 310 from the parent station 104 indicating receipt of the data burst 306 (808). The method 800 may further include forwarding the acknowledgment map 312 to the mobile station 108 (810).

In an example embodiment, there are two conditions for uplink transmission which should be considered: one in which the relay station receives the data burst successfully, and a second in which the relay station does not receive the data burst successfully. In the first condition, the relay station may receive data burst from the mobile station successfully. In the case in which the relay station receives the data burst successfully, the relay station may forward the data burst on a shared data channel and send an ACK or a codeword ACK on a shared ACK channel to the parent station. In the second condition, in which the relay station does not receive the data burst successfully, the relay station may not forward the data burst on the shared data channel, and may not send anything on the shared ACK channel.

According to an example embodiment, the receiving (802) includes receiving a plurality of data bursts. According to this example, the forwarding (804) includes forwarding the plurality of data bursts to the parent station 104. According to this example, the sending (806) may include sending a plurality of ACKs to the parent station 104. Also according to this example, the receiving (808) may include receiving the ACK map 310 indicating receipt of at least one of the plurality of data bursts.

According to another example, the method 800 may further include receiving, from the mobile station 108 via a data retransmission channel, a retransmitted data burst 314 which the ACK map 312 indicated was not successfully received by the parent station 104.

According to another example embodiment, the forwarding (804) may include synchronizing the forwarding the data burst to the parent station 104 with a relay station 106. According to this example, the sending (806) may include synchronizing the sending the ACK 308 to the parent station 104 with a relay station 106 in the wireless network 100 or virtual group 102.

Figure 9:
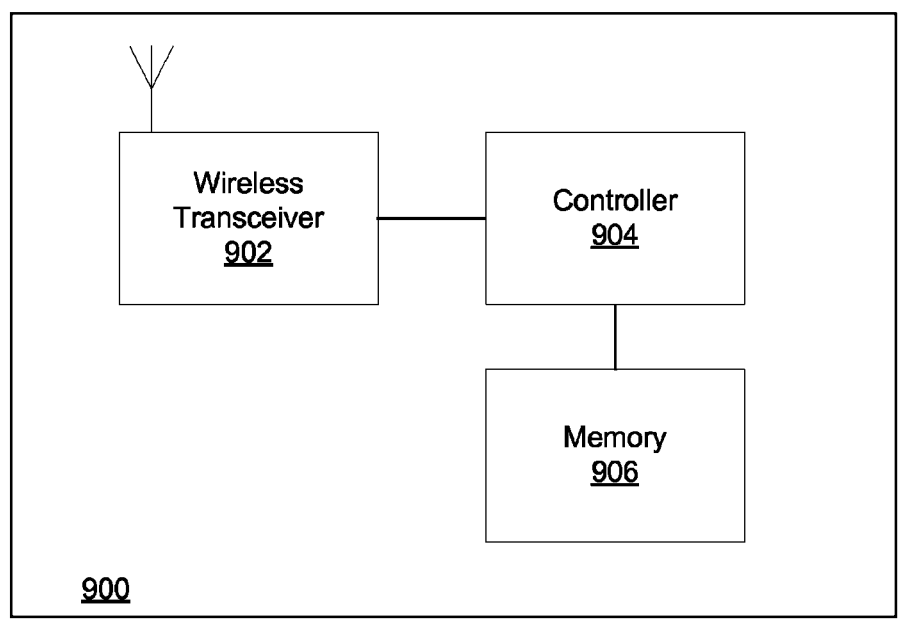
FIG. 9 is a block diagram of a wireless station according to an example embodiment.

FIG. 9 is a block diagram of a wireless station 900 according to an example embodiment. The wireless station (e.g. parent station, relay station or mobile station) may include, for example, a wireless transceiver 902 to transmit and receive signals, a controller 904 to control operation of the station and execute instructions or software, and a memory 906 to store data and/or instructions.

Controller 904 may be programmable and capable of executing software or other instructions stored in memory or on other computer media to perform the various tasks and functions described above, such as one or more the tasks or methods described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
transmitting a transmission schedule for a downlink data burst to a plurality of relay stations in a wireless network, the transmission schedule identifying a downlink data channel for downlink transmission of the downlink data burst and a corresponding uplink shared feedback channel for uplink transmission of an acknowledgment or a negative acknowledgment, the feedback channel being shared by the plurality of relay stations;
transmitting the downlink data burst to the plurality of relay stations via the downlink data channel; and
receiving the acknowledgment or the negative acknowledgment via the uplink shared feedback channel from at least two of the plurality of relay stations at approximately a same time and via approximately a same frequency band.

2. The method of claim 1 wherein the transmitting the transmission schedule comprises transmitting the transmission schedule within a frame, the transmission schedule including a downlink medium access protocol (MAP) message or schedule identifying a shared data channel for transmission of a data burst to a plurality of relay stations within a virtual group, and an uplink medium access protocol (MAP) message or schedule identifying a corresponding shared feedback channel for use by the plurality of relay stations within the virtual group to transmit, in a subsequent frame, an acknowledgment or a negative acknowledgment for the data burst.

3. The method of claim 1 wherein the transmitting the transmission schedule comprises transmitting the transmission schedule, the transmission schedule including a downlink medium access protocol (MAP) message or schedule within a first frame identifying a shared data channel for transmission of the data burst to the plurality of relay stations within a virtual group, and an uplink medium access protocol (MAP) message or schedule within a second or subsequent frame identifying a corresponding shared feedback channel for use by the plurality of relay stations within the virtual group to transmit an acknowledgment or a negative acknowledgment for the data burst.

4. The method of claim 1 wherein the shared feedback channel comprises a channel allocation for use by the plurality of relay stations within a virtual group to transmit an acknowledgment or a negative acknowledgment for the data burst, the channel allocation for the shared feedback channel comprising a carrier frequency and/or time slot allocation.

5. The method of claim 1 further comprising retransmitting the data burst to the plurality of relay stations in response to the receiving the acknowledgment or the negative acknowledgment from one or more of the relay stations via the shared feedback channel.

6. The method of claim 1 wherein:
the transmitting the transmission schedule includes transmitting the transmission schedule for the data burst to the plurality of relay stations in the wireless network, the transmission schedule identifying the data channel for transmission of the data burst, the corresponding shared feedback channel for transmission of the acknowledgment or the negative acknowledgment, and a corresponding shared end-to-end acknowledgment feedback channel for transmission of an acknowledgment, the end-to-end acknowledgment feedback channel being shared by the plurality of relay stations; and
the method further comprises retransmitting the data burst to the plurality of relay stations in response to not receiving, via the end-to-end acknowledgment feedback channel, an end-to-end acknowledgment from any of the plurality of relay stations.

7. The method of claim 6 wherein the transmission schedule comprises a downlink medium access protocol (MAP) message or transmission schedule in a first frame identifying the data channel for transmission of the data burst to a plurality of relay stations in a virtual group, and an uplink medium access protocol (MAP) message or transmission schedule in a second or subsequent frame identifying the shared feedback channel to allow one or more of the plurality of relay stations in the virtual group to transmit the acknowledgment or the negative acknowledgment for the data burst.

8. An apparatus comprising:
a controller; and
a non-transitory machine-readable storage device comprising instructions stored thereon that, when executed by the controller, are configured to cause the apparatus to perform:
transmitting a transmission schedule for a downlink data burst to a plurality of relay stations in a wireless network, the transmission schedule identifying a downlink data channel for downlink transmission of the downlink data burst and a corresponding uplink shared feedback channel for uplink transmission of an acknowledgment or a negative acknowledgment, the feedback channel being shared by the plurality of relay stations;
transmitting the downlink data burst to the plurality of relay stations via the downlink data channel; and
receiving the acknowledgment or the negative acknowledgment via the uplink shared feedback channel from at least two of the plurality of relay stations at approximately a same time and via approximately a same frequency band.

9. A non-transitory machine-readable storage device comprising instructions stored thereon that, when executed by a data processing apparatus, are configured to cause a wireless station to perform:
transmitting a transmission schedule for a downlink data burst to a plurality of relay stations in a wireless network, the transmission schedule identifying a downlink data channel for downlink transmission of the downlink data burst and a corresponding uplink shared feedback channel for uplink transmission of an acknowledgment or a negative acknowledgment, the feedback channel being shared by the plurality of relay stations;
transmitting the downlink data burst to the plurality of relay stations via the downlink data channel; and
receiving the acknowledgment or the negative acknowledgment via the uplink shared feedback channel from at least two of the plurality of relay stations at approximately a same time and via approximately a same frequency band.

* * * * *